Figure 1:
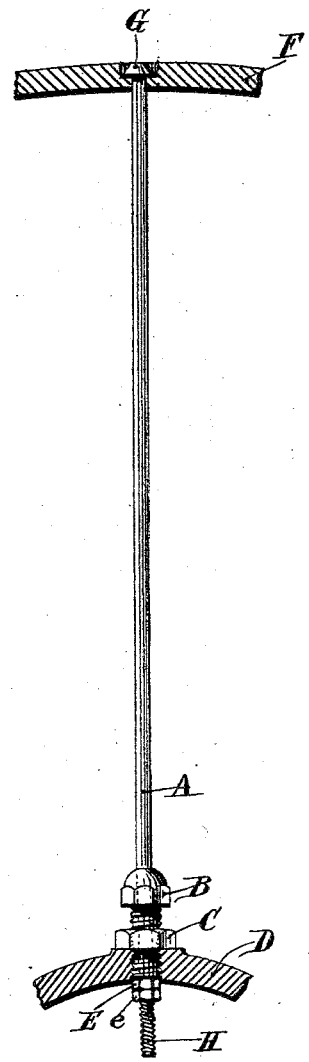

(No Model.)

2 Sheets—Sheet 1.

W. NOTLEY.
VEHICLE WHEEL.

No. 286,476. Patented Oct. 9, 1883.

WITNESSES:

INVENTOR.

William Notley
By J. E. Goldsworthy, atty (No Model.) 2 Sheets—Sheet 2.

W. NOTLEY.
VEHICLE WHEEL.

No. 286,476. Patented Oct. 9, 1883.

WITNESSES

INVENTOR:
William Notley
By J. E. Goldsworthy atty

UNITED STATES PATENT OFFICE.

WILLIAM NOTLEY, OF PAWTUCKET, ASSIGNOR OF ONE-HALF TO AUGUSTINE A. MANN, OF LINCOLN, RHODE ISLAND.

VEHICLE-WHEEL.

SPECIFICATION forming part of Letters Patent No. 286,476, dated October 9, 1883.

Application filed May 5, 1883. (No model.)

*To all whom it may concern:*

Be it known that I, WILLIAM NOTLEY, of the town of Pawtucket, in the county of Providence and State of Rhode Island, have invented new and useful Improvements in Wheel-Spokes; and I do hereby declare that the following, taken in connection with the drawings which accompany and form part of this specification, is a description of my invention sufficient to enable those skilled in the art to practice it.

My invention relates to the spokes of wheels belonging to that class of vehicles which combine portability, speed, and strength—such as bicycles, velocipedes, and other carriages of similar kinds.

The object of my invention is to provide a spoke that may be readily adjusted in the hub by the inexperienced as well as by the expert mechanic; and it consists, essentially, of two nuts at or near the hub end of the spoke, provided with a thread that runs, preferably, in a direction opposite to that of the annular nut of the spoke.

The spokes of bicycle-wheels have heretofore been provided with a head at the felly end and a thread that screwed in the hub at the opposite end. Another kind has been headed at both ends, and provided with an annular screw to screw into the hub, bearing on the head on the hub end to secure the proper adjustment of the spoke. Both kinds are skillfully wrought, and require special machinery for their production. A condition of this class of carriages, arising from their slender structure, is the frequent need of repair of the spokes. A weak point common to both kinds of spokes named arises in the head, which results from the cold-shut that forms during the process of heading the spoke. A second weak point in the former kind of spoke is at the periphery of the hub, at which point it is apt to break, leaving the piece in the hub to be removed by a drill. If, however, the head should pull off, this spoke could be reheaded, requiring no special skill, provided that the portion in the hub were sufficiently long to permit; but in that event the threads would be carried above the hub and would detract from the appearance of the carriage. In the spoke headed at both ends two objections exist: first, in case either head breaks off the spoke would be rendered useless for further service to the carriage, as the particular length of spoke required in the first instance will not admit of a new head being formed out of itself; second, the spoke, of necessity, must be headed at one end after it is placed in the felly, to accomplish which special appliances are required. My invention is designed to overcome these objections, whereby I secure cheapness of construction, facility, and cheapness of repair, and obviate the necessity of skilled workmanship in case of accidental breakage or derangement of the wheel.

Figure 2:
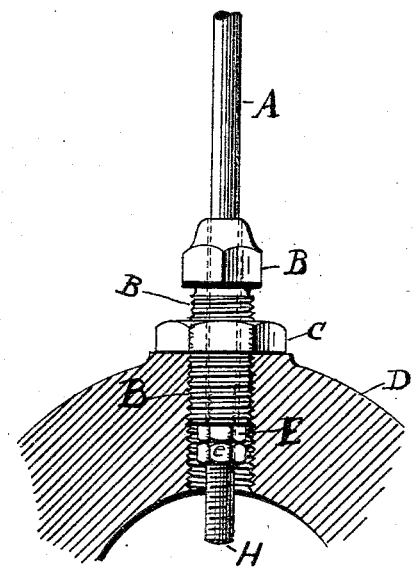

Figure 1 represents the spoke, annular screw, step-nut, and lock-nuts in perspective, and the contiguous parts of the wheel in section. Fig. 2 is an enlarged view of the parts represented in the lower portion of Fig. 1.

Similar letters refer to similar parts throughout the several views.

Referring to the drawings, A is the spoke, connecting the felly F and the hub D.

B is the annular screw, which screws into the hub until arrested by the step formed by the nut E near the hub end of the spoke. The nut E fills the office of the riveted and fixed head heretofore in use, and, as will be seen, may be extended toward the end of the spoke to allow for the forming of a new head out of the spoke at the opposite end in case the head pulls off. The office of the annular screw B is to effect the proper tension in the spoke. This is accomplished through the combination of the annular screw, the screw in the hub corresponding to it in thread into which it enters, and the step-nut E. The annular screw is intended to move freely on the spoke. The proper position of the step-nut will be determined by the tension effected on the spoke after screwing the annular screw into place. Should the proper place of the step-nut be miscalculated, the result would be too great or insufficient tension to the spoke, and would necessitate the removal of the annular screw from the hub, and a springing of the spoke out of its place to raise or lower the step-nut to meet the particular conditions.

C is a lock-nut belonging to the annular screw, and *e* is a lock-nut which secures the step-nut E from displacement.

G is the head, formed on the felly end of the spoke, and partly countersunk.

It will be observed that by releasing the lock-nut C and unscrewing the annular screw the spoke can be sprung out of the hub, the nuts E e and annular screw removed from the spoke, and the spoke drawn through the felly from the head without requiring particular skill or the use of special tools. It will also be seen that the owner of a carriage with wheels provided with my improved spoke can adjust the spoke to the proper tension at pleasure, can remove the spoke from the wheel and have it reheaded, if necessary, out of the surplus stock from the hub end at H, which is concealed in the hub, or can substitute for the old a new spoke without sending his carriage to the factory, where only repairs of this nature could heretofore be properly done.

I am aware that a nut has been heretofore used on the hub end of spokes, but for purposes essentially different from the use I make of it in my invention; hence I do not broadly claim said nut nor the annular screw.

What I claim as new, and desire to secure by Letters Patent, is—

1. In combination, a wheel-spoke, annular screw, and step-nut, substantially as specified.

2. The combination, substantially as specified, of a wheel-spoke, annular screw, lock-nut C, step-nut, and lock-nut e.

WILLIAM NOTLEY.

Witnesses:
SAML. L. PENDERGRASS,
JABEZ FOLLETT.